US006965718B2

(12) United States Patent
Koertel

(10) Patent No.: US 6,965,718 B2
(45) Date of Patent: Nov. 15, 2005

(54) APPARATUS AND METHOD FOR SUPPLYING POWER OVER AN OPTICAL LINK

(75) Inventor: Andreas H. Koertel, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/783,611

(22) Filed: Feb. 20, 2004

(65) Prior Publication Data
US 2005/0185903 A1 Aug. 25, 2005

(51) Int. Cl.[7] ............................................... G02B 6/44
(52) U.S. Cl. .................................................... 385/101
(58) Field of Search ........................................ 385/101

(56) References Cited

U.S. PATENT DOCUMENTS

| | | | | | |
|---|---|---|---|---|---|
| 4,479,702 | A | * | 10/1984 | Pryor et al. | 385/101 |
| 5,228,104 | A | * | 7/1993 | Desmons | 385/72 |
| 5,574,815 | A | * | 11/1996 | Kneeland | 385/101 |
| 5,677,974 | A | * | 10/1997 | Elms et al. | 385/101 |
| 5,745,627 | A | * | 4/1998 | Arroyo et al. | 385/101 |
| 6,454,462 | B2 | * | 9/2002 | Nguyen et al. | 385/53 |
| 2002/0110339 | A1 | * | 8/2002 | Dittmann | 385/101 |

OTHER PUBLICATIONS

"Fiber-Optic Cables LWL-Kabel", [webpage] [online] data sheet by Rosenberger OSI Fiber-Optics GMBH & Co. KG, Retrieved from the internet: http://www.osi-fiber.de/OSI-Fiber-Optics_english/Products/Fiber-Optic Cables/Fiberdata.pdf Total page: 1, no date.
"Technical Data Sheet Optical fiber OSI-B", [webpage] [online] data sheet by Rosenberger OSI Fiber-Optics GMBH & Co. KG, Retrieved from the internet: http://www.osi-fiber.de/OSI-Fiber-Optics_english/Products/Fiber-Optic Cables/Fiberdata.pdf Total page: 1, Feb. 3, 2003.
"Technical Data Sheet Optical fiber OSI-A", [webpage] [online] data sheet by Rosenberger OSI Fiber-Optics GMBH & Co. KG, Retrieved from the internet: http://www.osi-fiber.de/OSI-Fiber-Optics_english/Products/Fiber-Optic Cables/Fiberdata.pdf Total page: 1, Feb. 3, 2003.
"Technical Data Sheet Optical Fiber OM3G5-A", [webpage] [online] data sheet by Rosenberger OSI Fiber-Optics GMBH & Co. KG, Retrieved from the internet: http://www.osi-fiber.de/OSI-Fiber-Optics_english/Products/Fiber-Optic Cables/Fiberdata.pdf Total page: 1, Feb. 3, 2003.
"Technical Data Sheet Optical Fiber OM2G5-A", [webpage] [online] data sheet by Rosenberger OSI Fiber-Optics GMBH & Co. KG, Retrieved from the internet: http://www.osi-fiber.de/OSI-Fiber-Optics_english/Products/Fiber-Optic Cables/Fiberdata.pdf Total page: 1, Feb. 3, 2003.
"Technical Data Sheet Optical Fiber OM2G5-B", [webpage] [online] data sheet by Rosenberger OSI Fiber-Optics GMBH & Co. KG, Retrieved from the internet: http://www.osi-fiber.de/OSI-Fiber-Optics_english/Products/Fiber-Optic Cables/Fiberdata.pdf Total page: 1, Feb. 3, 2003.

(Continued)

Primary Examiner—Javaid H. Nasri

(57) ABSTRACT

In one embodiment, apparatus for supplying power over an optical link is provided. The apparatus includes a hybrid cable including an optical fiber and a conductor, wherein the optical fiber is configured to transmit an optical signal and the conductor is configured to transmit a power signal. In another embodiment, a method for supplying power over an optical link, includes: providing a hybrid cable in a network system, wherein the hybrid cable includes an optical fiber and a conductor; and transmitting an optical signal along the optical fiber, and transmitting a power signal along the conductor.

38 Claims, 6 Drawing Sheets

OTHER PUBLICATIONS

"Technical Data Sheet Optical Fiber OM1G6-B", [webpage] [online] data sheet by Rosenberger OSI Fiber-Optics GMBH & Co. KG, Retrieved from the internet: http://www.osi-fiber.de/OSI-Fiber-Optics_english/Products/Fiber-Optic Cables/Fiberdata.pdf Total page: 1, Feb. 3, 2003.

"Technical Data Sheet Optical Fiber OM1G6-A", [webpage] [online] data sheet by Rosenberger OSI Fiber-Optics GMBH & Co. KG, Retrieved from the internet: http://www.osi-fiber.de/OSI-Fiber-Optics_english/Products/Fiber-Optic Cables/Fiberdata.pdf Total page: 1, Feb. 3, 2003.

* cited by examiner

APPARATUS AND METHOD FOR SUPPLYING POWER OVER AN OPTICAL LINK

TECHNICAL FIELD

Embodiments of the invention relate generally to communication links, and more particularly to an apparatus and method for supplying power over an optical link (cable with an optical fiber).

BACKGROUND

Currently, power can only be transported from a network node (endpoint) to another node by use of a copper cable. This copper cable is commonly known as Category 5 (CAT5) which is a network cable formed by four twisted pairs of copper wire terminated by RJ45 (Registered Jack-45) connectors. Problems associated with distance, security risk, reliability, and electrical/magnetic interference are prohibitive factors in the usage of copper cables as network links. Security risk is an issue because the electrical signals can be captured without tampering the cable itself. Reliability is an issue because of the possibility of electrical and magnetic interference that can disrupt communication across the network.

Fiber optic links advantageously permit data transmission at a high speed over relatively longer distances and avoid interference from electrical signals. In contrast, signals that are transmitted over copper cables may be subject to electrical and magnetic interference from power signals that are also transmitted across a network.

A wireless access point serves as an access point for users of a wireless network. As an example, a wireless access point may be located on a ceiling of a building room, and it may be difficult to provide power to the wireless access point because power outlets typically are not located on the ceiling. Currently, power-over-Ethernet is used to supply power to these wireless access points. Given the current increasing requests for power-over-Ethernet, more customers are also asking for fiber optic connectivity to a wireless access point, as an example. However, in current network systems, power can not be supplied to a wireless access point (and/or to other network nodes) over a fiber optic cable.

Therefore, the current technology is limited in its capabilities and suffers from at least the above constraints and deficiencies.

SUMMARY OF EMBODIMENTS OF THE INVENTION

In one embodiment of the invention, apparatus for supplying power over an optical link is provided. The apparatus includes a hybrid cable including an optical fiber and a conductor, wherein the optical fiber is configured to transmit an optical signal and the conductor is configured to transmit a power signal.

In another embodiment of the invention, a network system, includes: a hybrid cable including an optical fiber and a conductor; a first node; a second node; wherein the first node is configured to transmit an optical signal via the optical fiber to the second node, or alternatively the first node is configured to receive a second optical signal via the optical fiber from the second node; and a power source configured to transmit a power signal via the conductor to the second node.

In another embodiment of the invention, a method for supplying power over an optical link, includes: providing a hybrid cable in a network system, wherein the hybrid cable includes an optical fiber and a conductor; and transmitting an optical signal along the optical fiber, and transmitting a power signal along the conductor.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

An embodiment of the invention provides a method and apparatus for supplying power to a remote network end node that is connected by an optical fiber connection. In particular, an embodiment of the invention provides a hybrid cable that combines an optical fiber with a conductor, such as a single copper wire, a twisted pair of solid or flexible conductor, stainless steel, or another type of conductor.

Figure 1:
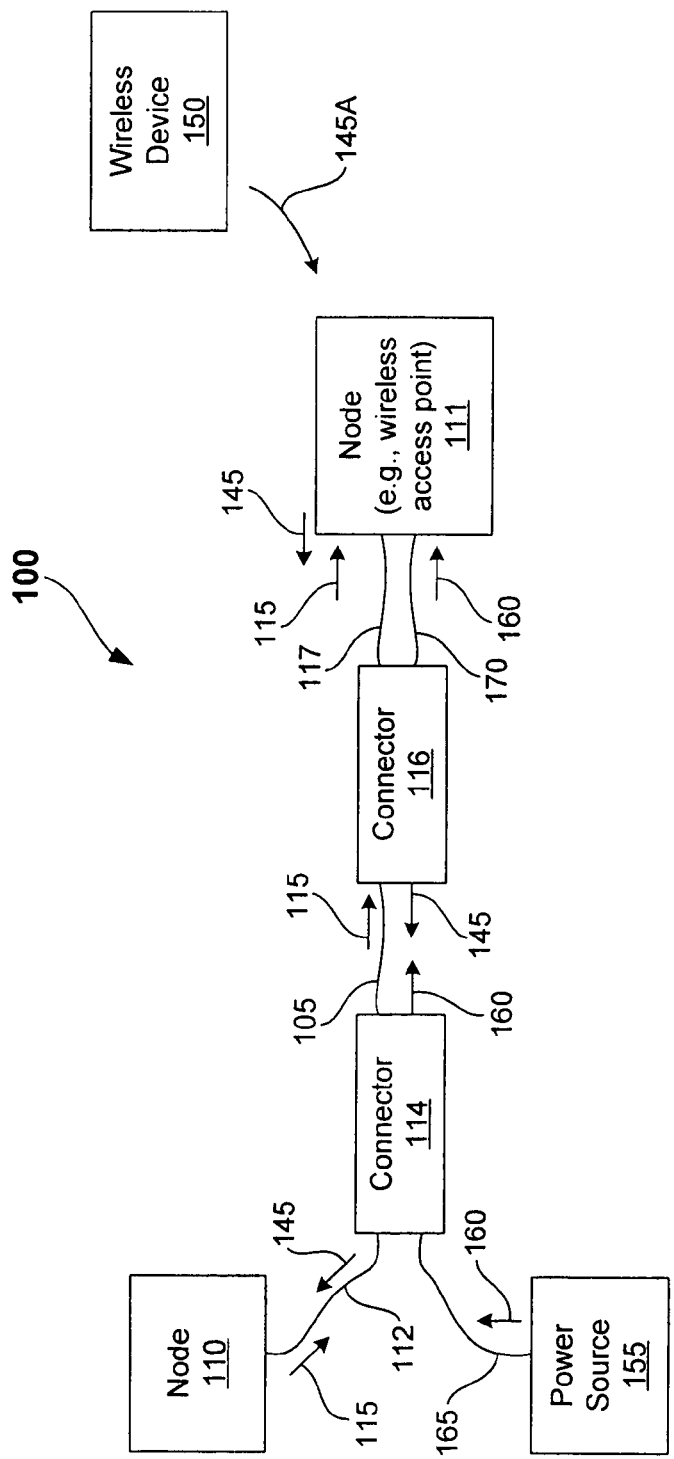
FIG. 1 is a block diagram of a network system that can implement an apparatus in accordance with an embodiment of the invention.

FIG. 1 is a block diagram of a network system 100 that can implement an apparatus in accordance with an embodiment of the invention. The network system 100 includes a hybrid cable 105 in accordance with an embodiment of the invention. A node 110 can transmit an optical signal 115 via a fiber optic link 112 to a connector 114. The node 110 can be, for example, a server or other suitable device in the network system 100. The optical signal 115 is then transmitted from the connector 114 via hybrid cable 105 to a second connector 116. The optical signal 115 is then transmitted from the connector 116 via a fiber optic link 117 to a node 111 which will process the optical signal 115. The node 111 can be, for example, a wireless access point or other suitable device in the network system 100.

The node 111 can transmit an optical signal 145 via fiber optic link 117 to the connector 116. For example, if the node 111 is a wireless access point, then the optical signal 145 may be a signal generated by the wireless access point in response to a wireless signal 145A that is received by the wireless access point from a wireless device 150. Of course, the optical signal 145 may be generated by the node 111 in response to other actions or operations. The optical signal 145 is then transmitted from the connector 116 via hybrid cable 105 to the connector 114. The optical signal 145 is then transmitted from the connector 114 via fiber optic link 112 to the node 110 which will process the optical signal 125.

A power source 155 can transmit a power signal 160 via a conductor 165 to the connector 114. The power signal 160 may have a value of, for example, about 48 volts, about 5 volts, about 3 volts, or any suitable voltage value that is required for the node 111. The conductor 165 may be, for example, formed by a CAT5 cable. The power signal 160 is then transmitted from the connector 114 via hybrid cable 105 to the second connector 116. The power signal 160 is then transmitted from the connector 116 via conductor 170 to the node 111. The power signal 160 provides the necessary power to permit the node 111 to function.

As a result, an embodiment of the hybrid cable 105 provides power to permit the node 111 to function, without the requirement of a separate cable for providing a power signal to the node 111. The hybrid cable 105 is particularly advantageous if the node 111 is located at a relatively long distance from the power source 155 or if the node 111 can not be coupled to a power outlet.

The connector 114 receives the optical signal 115 via fiber optic link 112 and the power signal 160 via conductor 165, and permits the optical signal 115 and the power signal 160 to be transmitted on the single hybrid cable 105.

The connector 116 receives the optical signal 115 and the power signal 160 from the hybrid cable 105, and permits the optical signal 115 to be transmitted separately via fiber optic link 117 and permits the power signal 160 to be transmitted separately via conductor 170.

The connectors 114 and 116 can be designed based upon methods known to those skilled in the art and may be modified based upon the different network configurations that will use the connectors 114 and 116 and the hybrid cable 105. For example, the connector 114 may include an electrical connector (e.g., an RJ45 connector) that permits transmission of the power signal 160, and an optical connector that permits transmission of the optical signals 115 and 145, where the electrical connector and optical connector are spliced together in order to achieve the above-mentioned functionality. The connector 116 may also be formed by this configuration of an electrical connector and an optical connector that are spliced together. The connectors 114 and 116 may be manufactured and assembled by use of suitable methods that are known to those skilled in the art.

The connector 116 can also receive the optical signal 145 via optical link 117 and transmit the optical signal 145 via hybrid cable 105. The connector 114 can then receive the optical signal 145 via hybrid cable 105 and transmit the optical signal 145 via optical link 112.

In order to be able to use the hybrid cable 105 in existing network installations, it is noted that the currently used fiber connectors (e.g., fiber SC, LC, or ST connectors) are not able to connect to a conductor (e.g., conductors 130A and 130B in FIG. 2) for transmitting power across the hybrid cable 105. Furthermore, the currently used fiber connections are metallized and would therefore short circuit the power supplied from the opposite side of the hybrid cable 105. In order to solve this issue, the conductors 130A and 130B in the hybrid cable 105 are connected to a separate plug on each end of the hybrid cable 105. This separate plug is contained in each of the connectors 114 and 116 in FIG. 1, and is wired to or spliced in with the fiber connector with a shrink loom pigtail-style connector or a box style assembly (similar to the coaxial Ethernet taps), or can be other suitable configurations. This separate plug will terminate the conductors 130A and 130B in the hybrid cable 105 and typically has a separate power jack.

Figure 2:
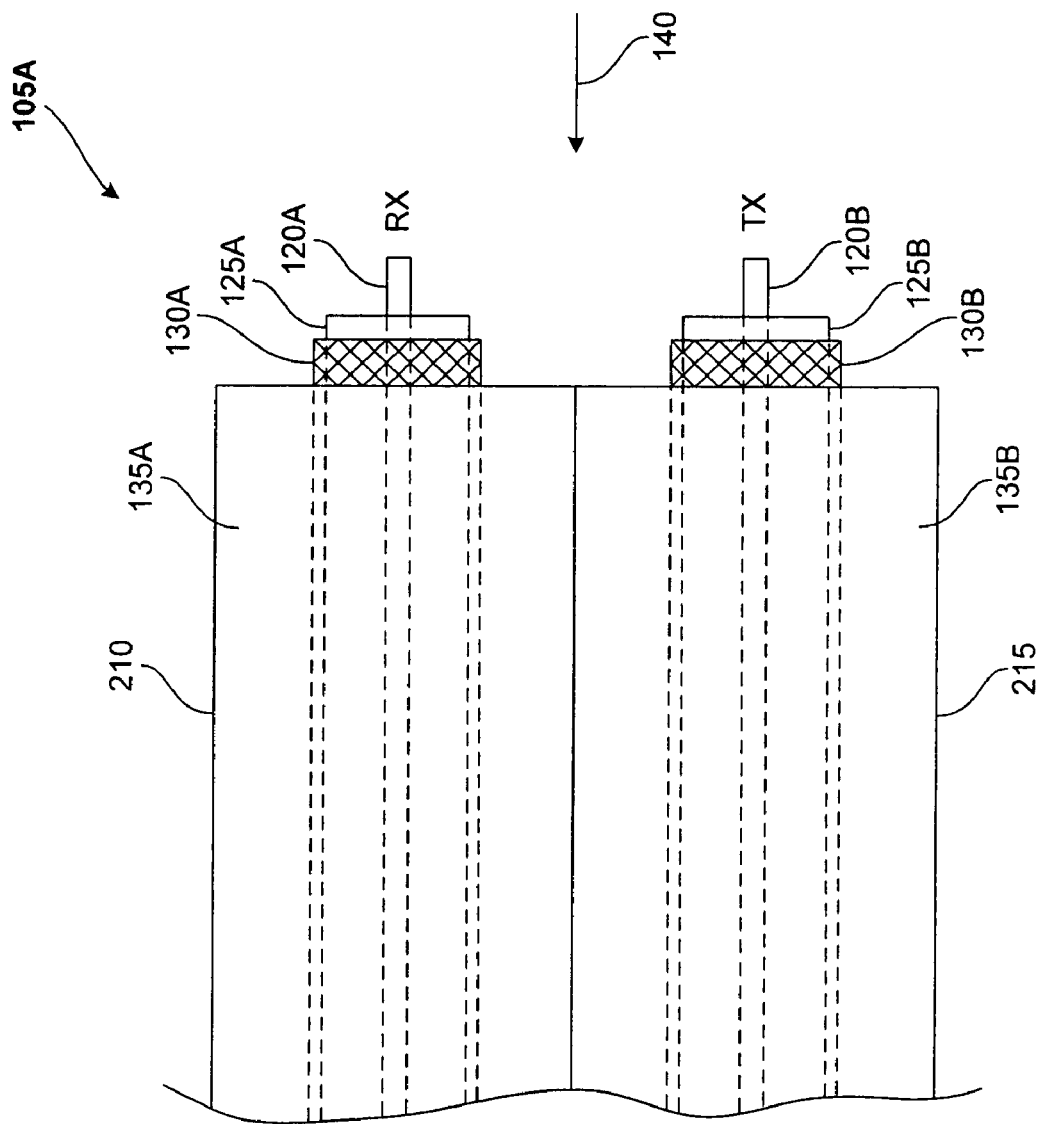
FIG. 2 is a block diagram of an apparatus shown in partial view, in accordance with an embodiment of the invention.

FIG. 2 is a block diagram of an apparatus shown in partial view, in accordance with an embodiment of the invention. The apparatus is formed by a hybrid cable 105A in a coaxial configuration (i.e., concentric configuration) as described below, in accordance with an embodiment of the invention. The hybrid cable 105A is one embodiment of the hybrid cable 105 that is shown in FIG. 1. The hybrid cable 105A includes an optical fiber in the center, surrounded by an insulating material (inner protection) and a concentric outer conductor and an outer sheet (outer protection).

In an embodiment of the invention, the hybrid cable 105A includes a receiving (RX) portion 210 and a transmitting (TX) portion 215. The receiving portion 210 includes an optical fiber 120A, surrounded by an inner protection 125A. The inner protection 125A is surrounded by a concentric outer conductor 130A. Therefore, the inner protection 125A is disposed between the optical fiber 120A and the conductor 130A. The conductor 130A is surrounded by an outer protection 135A. Therefore, the optical fiber 120A, inner protection 125A, and conductor 130A are all disposed internally within the outer protection 135A.

The transmitting portion 215 includes an optical fiber 120B, surrounded by an inner protection 125B. The inner protection 125B is surrounded by a concentric outer conductor 130B. The outer conductor 130B is surrounded by an outer protection 135B.

The optical fibers 120A and 120B (generally referred herein as optical fiber 120) can be any fiber optic cable that is made to any suitable specification. Currently, there are two major specifications in fiber optic technology: (1) singlemode fiber, and (2) multimode fiber. Various suitable types of optical fibers 120 are manufactured by various vendors such as, for example, Rosenberger OSI Fiber Optics GmbH & Co. The various specifications for singlemode fibers and multimode fibers are disclosed in, for example, technical datasheets from Rosenberger OSI Fiber Optics GmbH & Co., entitled "FIBER-OPTIC CABLES LWL-KABEL", "Technical Data Sheet Optical fiber OS1-B", "Technical Data Sheet Optical fiber OS1-A", "Technical Data Sheet Optical fiber OM3G5-A", "Technical Data Sheet Optical fiber OM2G5-A", "Technical Data Sheet Optical fiber OM2G5-B", "Technical Data Sheet Optical fiber OM1G6-B", and "Technical Data Sheet Optical fiber OM1G6-A", all of which are hereby fully incorporated herein by reference.

The singlemode fiber is a single glass fiber, while the multimode fiber is typically a bundle of plastic material fibers. The multimode fiber has a larger surface area to transport light and typically is used to transmit signals from less expensive light emitting diode (LED) lasers. The single mode fiber is typically used to transmit signals from optical lasers and can therefore span longer distances, but may be susceptible to breakage.

The optical fiber 120B in the transmitting portion 215 is used to transmit the optical signal 115 (FIG. 1) from the node 110 to the node 111, while the optical fiber 120A in the receiving portion 210 is used to transmit the optical signal 145 from the node 111 to the node 110.

The inner protections 125A and 125B (generally referred herein as inner protection 125) can be a non-conductive material such as, for example, polyethylene (a polymerized ethylene resin) foam, high density foam, plastic, another type of non-conductive material, or another type of insulating material. The inner protection 125 provides protection for the optical fiber 120 which can easily break, particularly if a connector is coupled to the optical fiber 120.

The inner protection 125 can be a hard material or soft material, and the bending radius of the inner protection 125 can be selected to a desired value that may be dictated by the particular application or environment of the hybrid cable 105A. The inner protection 125 can also be fire resistant and/or liquid (e.g., water) resistant. Preferably, the inner protection 125 will keep the outer conductor 130 as aligned (secured) in position in the hybrid cable 105A, so that the impedance value of the hybrid cable 105A does not change. Other characteristics of the inner protection 125 can be selected based upon the environment of the hybrid cable 105A (e.g., depending on whether the hybrid cable 105A is in an outdoor setting, indoor setting, high-temperature setting, or other setting or combination of settings).

Figure 6A:
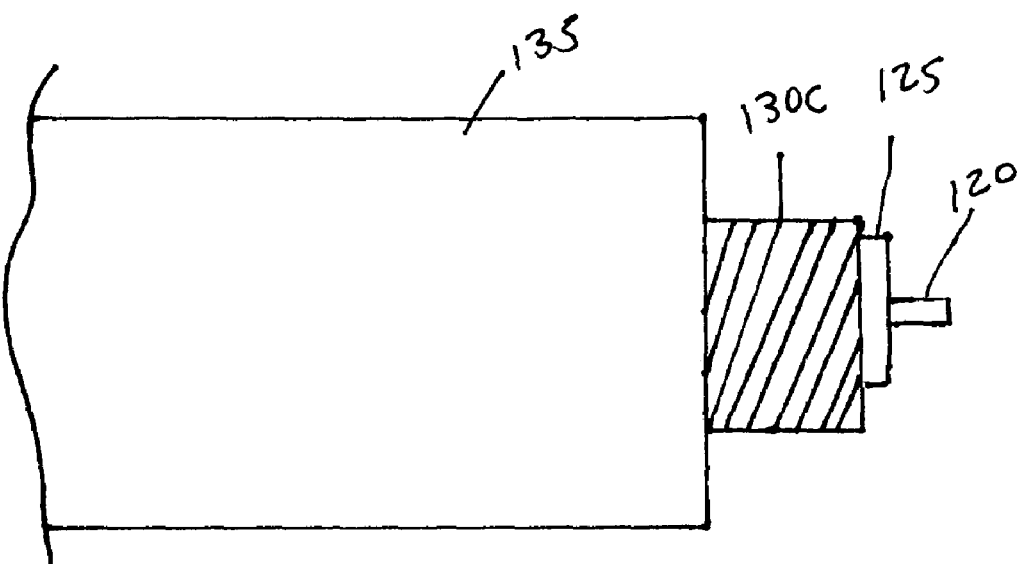
FIG. 6A is a block diagram of an apparatus, in accordance with another embodiment of the invention.
Figure 6B:
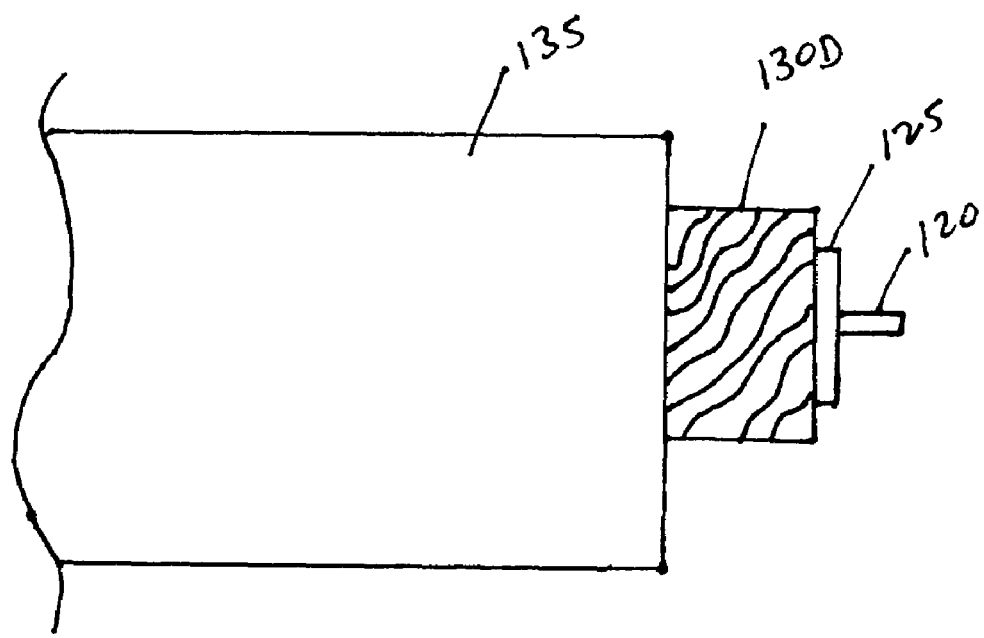
FIG. 6B is a block diagram of an apparatus, in accordance with another embodiment of the invention.

The outer conductors 130A and 130B (generally referred herein as outer conductor 130) can be a conducting material such as, for example, copper, stainless steel, or another type of conducting material. In an embodiment, the outer conductor 130 is typically a mesh configuration (chain-link-fence-style mesh) as shown in FIG. 2. The mesh configuration for a conductor is commonly used in current coaxial cables. However, the outer conductor 130 can another style of configuration and is not necessarily limited to the mesh configuration. For example, the conductor 130 can be a single conductive (e.g., copper) wire, a twisted pair 130C of solid conductor (FIG. 6A), or a twisted pair 130D of flexible conductor (FIG. 6B). If additional protection is desired for the optical fiber 120, then the outer conductor 130 should be a relatively stiff material such as, for example, stainless steel or another suitable type of conductor.

The outer protections 135A and 135B (generally referred herein as outer protection 135) can be any suitable non-conductive durable material or insulating durable material, such as the outer protection materials used in standard cables or power chords. For example, the outer protection 135 is a plastic material or other suitable materials. The outer protection 135 can be resistant to environmental hazards such as, for example, abrasion, liquid (e.g., water) intrusion, solar radiation, fire, and/or another type of hazard. The outer protection is typically made from an insulating, durable material such as, for example, plastic or other suitable material.

The thickness of the outer protection 135 can depend on whether the hybrid cable 105A will be used in an indoor environment or outdoor environment or other setting. Additionally, the outer protection 135 may transmit a high voltage value (e.g., about 48 volts) or other voltage values. Therefore, the outer protection 135 should provide sufficient insulation to prevent electrical interference and magnetic interference with another conductor that may be in the same environment as the hybrid cable 105A. This type of insulation will depend on the application and setting of the hybrid cable 105A.

By combining the two optical fibers 120A and 120B and the conductors 130A and 130B in the hybrid cable 105A, it would be possible to achieve the necessary electrical connection to provide power to a fiber-connected endpoint, such as node 111 in the example of FIG. 1.

In an alternative embodiment of the invention, the hybrid cable 105A has only a transmitting portion 210. Alternatively, the hybrid cable 105A has only a receiving portion 215. Therefore, this embodiment of the hybrid cable 105A will only have one optical fiber 120, one inner protection 125, one outer conductor 130, and one outer protection 135.

The hybrid cable 105A may be manufactured and assembled by use of suitable methods that are known to those skilled in the art.

Figure 3:
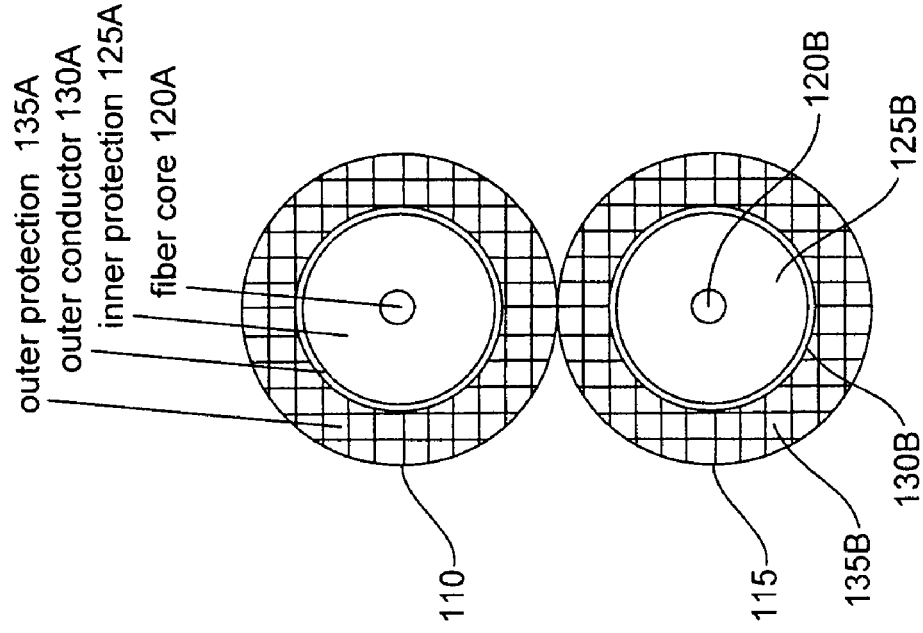
FIG. 3 is another block diagram of the apparatus in FIG. 2, in accordance with an embodiment of the invention.

FIG. 3 is another block diagram of the apparatus in FIG. 2, in accordance with an embodiment of the invention. The block diagram of hybrid cable 105A shown in FIG. 3 is seen in the direction of arrow 140 in FIG. 2. The coaxial configuration of the optical fiber (fiber core) 120, inner protection 125, outer conductor 130, and outer protection 135 is seen in FIG. 3. The optical fiber 120, inner protection 125, outer conductor 130, and outer protection 135 are arranged in a concentric configuration.

Figure 4:
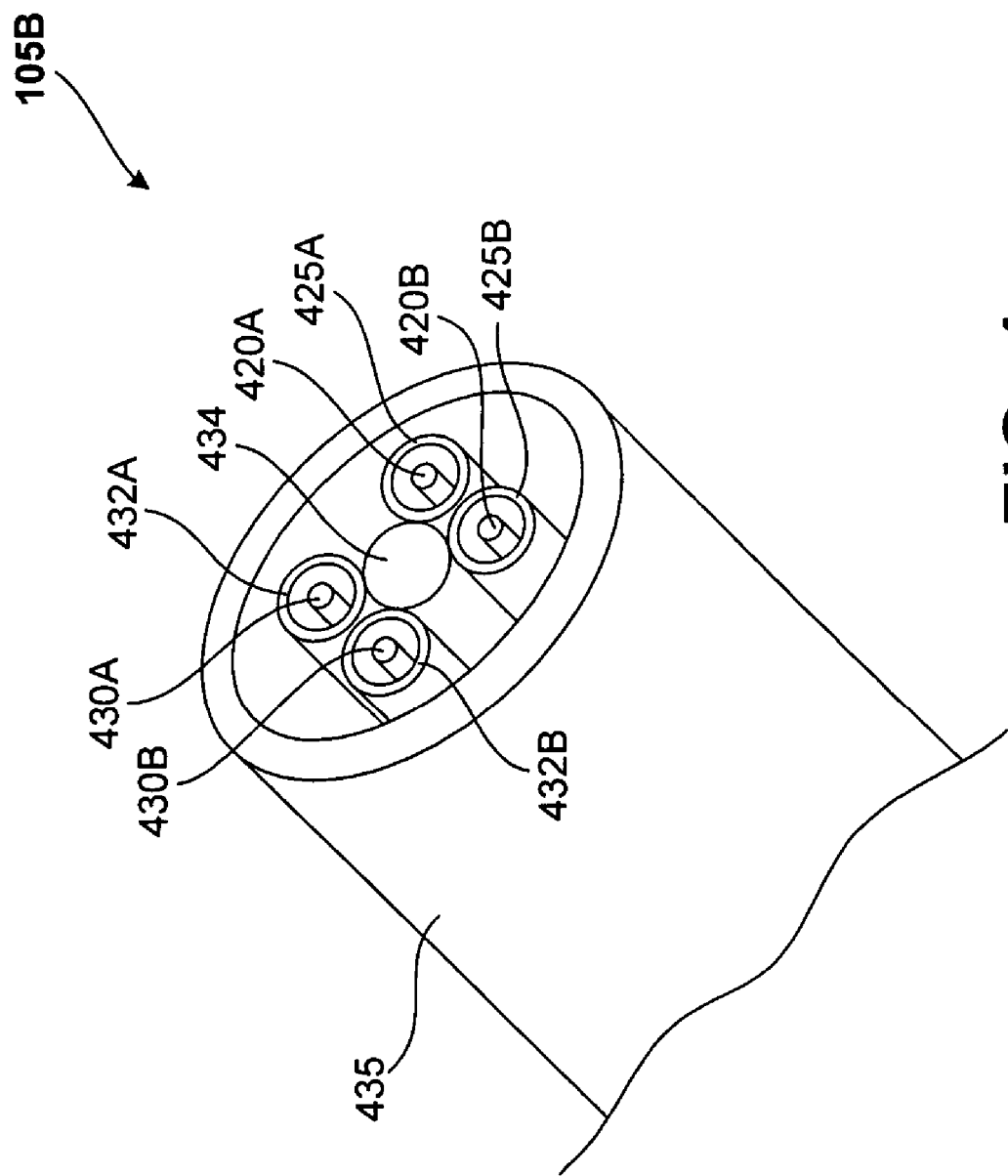
FIG. 4 is a block diagram of another apparatus shown in partial view, in accordance with an embodiment of the invention.

FIG. 4 is a block diagram of another apparatus shown in partial view, in accordance with an embodiment of the invention. The apparatus is formed by a hybrid cable 105B with at least one fiber optic link that is parallel with at least one conductor as described below, in accordance with an embodiment of the invention. The hybrid cable 105B is another embodiment of the hybrid cable 105 that is shown in FIG. 1.

The hybrid cable 105B includes an optical fiber 420A that is used for receiving an optical signal and an optical fiber 420B that is used for transmitting an optical signal. The optical fibers 420A and 420B can be formed from the same materials as the materials that may be used to form the optical fibers 120A and 120B in FIG. 2.

An inner protection 425A surrounds the optical fiber 420A in a concentric and coaxial configuration. An inner protection 425B surrounds the optical fiber 420B in a concentric and coaxial configuration. The inner protections 425A and 425B can be formed from the same materials as the materials that may be used to form the inner protections 125A or 125B in FIG. 2.

The hybrid cable 105B also includes conductors 430A and 430B for transmitting power to a fiber-connected endpoint, such as node 111 in the example of FIG. 1. In another embodiment, only one of the conductors 430A and 430B are implemented in the hybrid cable 105B.

A protection layer 432A surrounds the conductor 430A in a concentric and coaxial configuration. A protection layer 432B surrounds the conductor 430B in a concentric and coaxial configuration. The protection layers 432A and 432B can be formed from the same materials as the materials that may be used to form the outer protections 135A and 135B in FIG. 2.

An optional non-conductive material 434 may be inserted in parallel with the inner protection layers 425A and 425B and protection layers 432A and 432B, in order to prevent displacement of the optical fibers 420A and 420B and conductors 430A and 430B and to secure the alignment of the optical fibers 420A and 420B and conductors 430A and 430B within the outer protection 435.

An outer protection 435 surrounds the inner protection layers 425A and 425B and protection layers 432A and 432B, so that the inner protection layers 425A and 425B and protection layers 432A and 432B are disposed within the outer protection 435. The outer protection 435 can be formed from the same materials as the materials that may be used to form the outer protections 135A and 135B in FIG. 2.

As shown in FIG. 4, the optical fibers 420A and 420B, conductors 430A and 430B, inner protections 425A and 425B, and protections 432A and 432B are all disposed in parallel with each other and with the outer protection 435. The optical fibers 420A and 420B, conductors 430A and 430B, inner protections 425A and 425B, and protections 432A and 432B are all disposed internally within the outer protection 435. Also, the number of optical fibers 420 and conductors 430 within the outer protection 435 may be varied.

The hybrid cable 105B may be manufactured and assembled by use of suitable methods that are known to those skilled in the art.

Figure 5:
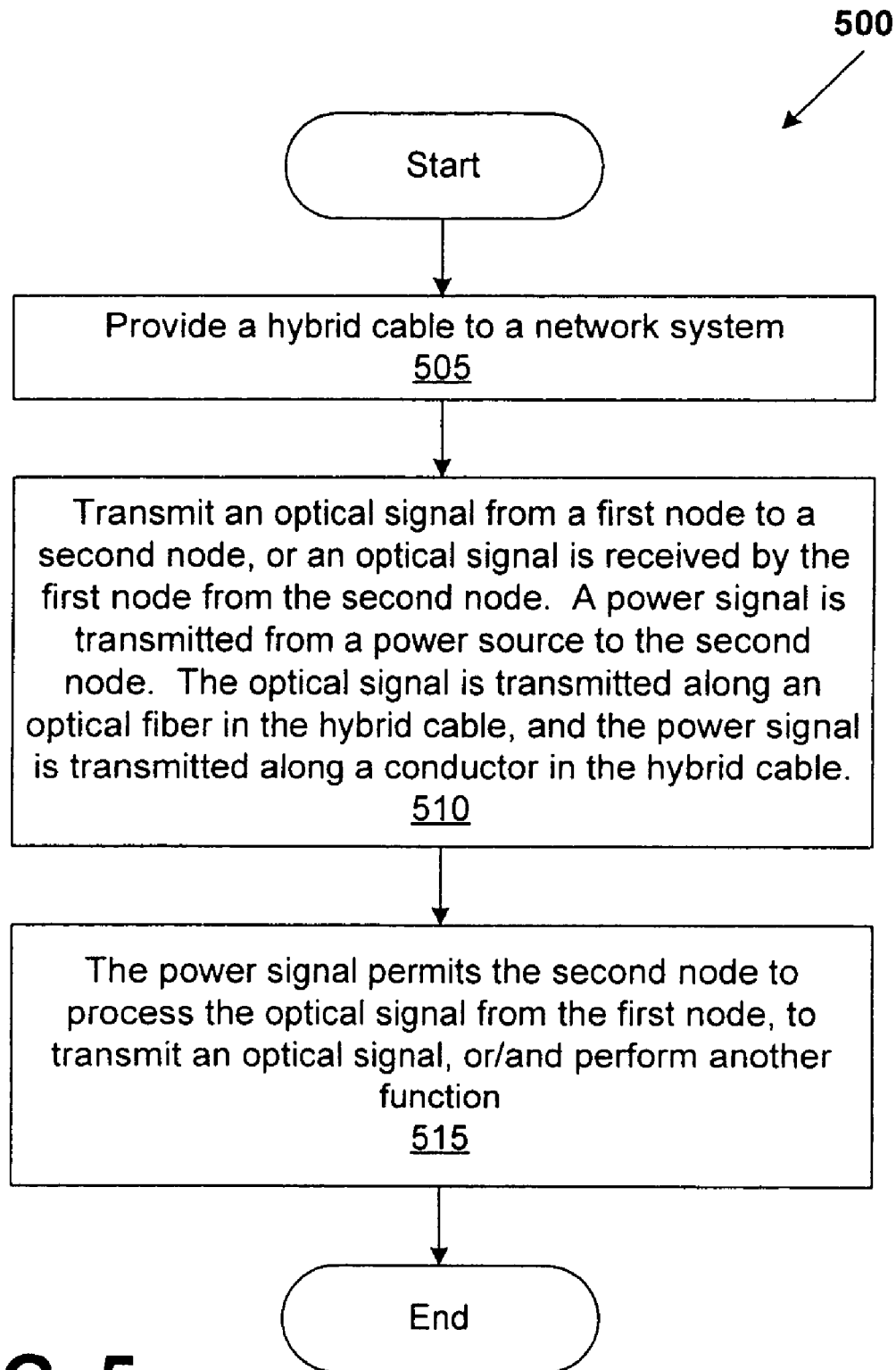
FIG. 5 is a flowchart of a method in accordance with an embodiment of the invention.

FIG. 5 is a flowchart of a method 500 in accordance with an embodiment of the invention. In step (505), a hybrid cable is provided to a network system. The hybrid cable includes an optical fiber 120 (see FIG. 2) and a conductor 130. Typically, the optical fibers 120A and 120B (FIG. 2) represent the optical fiber 120 and the conductors 130A and 130B represent the conductor 130. In step (510), an optical signal is transmitted from a first node to a second node, or an optical signal is received by the first node from the second node, and a power signal is transmitted from a power source to the second node. The optical signal is transmitted along the optical fiber 120 in the hybrid cable, and the power signal is transmitted along the conductor 130 in the hybrid cable. In step (515), the power signal permits the second node to process the optical signal from the first node, to transmit an optical signal, or/and perform another function.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure.

It will also be appreciated that one or more of the elements depicted in the drawings/figures can also be implemented in a more separated or integrated manner, or even removed or rendered as inoperable in certain cases, as is useful in accordance with a particular application.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus for supplying power over an optical link, the apparatus comprising:
   a hybrid cable including an optical fiber, an outer conductor, and a non-conductive material between the optical fiber and the outer conductor, wherein the optical fiber is configured to transmit an optical signal and the conductor is configured to transmit a power signal;
   a first fiber optic link;
   a first node;
   a first connector coupled by the first fiber optic link to the first node;
   a first conductor;
   a power source, wherein the first connector is further coupled by the first conductor to the power source;
   a second fiber optic link;
   a second node;
   a second connector coupled by the second fiber optic link to the second node; and
   a second conductor, wherein the second connector is coupled by the second conductor to the second node.

2. The apparatus of claim 1, wherein the optical fiber and the outer conductor are disposed internally within the hybrid cable.

3. The apparatus of claim 1, wherein the fiber and the outer conductor are coaxial in configuration.

4. The apparatus of claim 1, wherein the optical fiber is parallel to the outer conductor.

5. The apparatus of claim 1, wherein the outer conductor comprises copper.

6. The apparatus of claim 1, wherein the outer conductor comprises stainless steel.

7. The apparatus of claim 1, wherein the outer conductor comprises:
   a twisted pair of solid conductor.

8. The apparatus of claim 1, wherein the outer conductor comprises:
   a twisted pair of flexible conductor.

9. The apparatus of claim 1, wherein the outer conductor comprises a mesh configuration.

10. The apparatus of claim 1 wherein the second node comprises a wireless access point and wherein a wireless device communicates with the wireless access point by use of a wireless signal.

11. The apparatus of claim 1, further comprising:
    an outer protection disposed on the outer conductor.

12. The apparatus of claim 1, wherein the hybrid cable comprises:
    a second optical fiber and a second outer conductor.

13. A network system, comprising:
a hybrid cable including an optical fiber, an outer conductor, and an insulator between the optical fiber and the outer conductor;
a first fiber optic link;
a first node;
a first connector coupled by the first fiber optic link to the first node;
a second fiber optic link;
a second node;
a second connector coupled by the second fiber optic link to the second node;
a first conductor;
a second conductor, wherein the second connector is coupled by the second conductor to the second node;
wherein the first node is configured to transmit an optical signal via the optical fiber to the second node, or alternatively the first node is configured to receive a second optical signal via the optical fiber from the second node; and
a power source configured to transmit a power signal via the conductor to the second node, wherein the first connector is further coupled by the first conductor to the power source.

14. The apparatus of claim 13, wherein the optical fiber and the outer conductor are disposed internally within the hybrid cable.

15. The apparatus of claim 13, wherein the optical fiber and the outer conductor are coaxial in configuration.

16. The apparatus of claim 13, wherein the optical fiber is parallel to the outer conductor.

17. The apparatus of claim 13, wherein the outer conductor comprises copper.

18. The apparatus of claim 13, wherein the outer conductor comprises stainless steel.

19. The apparatus of claim 13, wherein the outer conductor comprises:
a twisted pair of solid conductor.

20. The apparatus of claim 13, wherein the outer conductor comprises:
a twisted pair of flexible conductor.

21. The apparatus of claim 13, wherein the outer conductor comprises a mesh configuration.

22. The network system of claim 13 wherein the second node comprises a wireless access point and wherein a wireless device communicates with the wireless access point by use of a wireless signal.

23. The apparatus of claim 13, further comprising:
an outer protection disposed on the outer conductor.

24. The apparatus of claim 13, wherein the hybrid cable comprises:
a second optical fiber and a second outer conductor.

25. A method for supplying power over an optical link, the method comprising:
providing a hybrid cable in a network system, wherein the hybrid cable includes an optical fiber, an outer conductor, and a non-conductive material between the optical fiber and the outer conductor; and
transmitting an optical signal along the optical fiber, and transmitting a power signal along the outer conductor, including transmitting the optical signal from a first node via a first fiber optic link to a first connector, transmitting the optical signal from the first connector via the optical fiber to a second connector, transmitting the optical signal from the second connector via a second fiber optic link to a second node, transmitting the power signal from a power source via a first conductor to the first connector, transmitting the power signal from the first connector via the outer conductor to the second connector, and transmitting the power signal from the second connector to the second node.

26. The method of claim 25, wherein the optical fiber and the outer conductor are disposed internally within the hybrid cable.

27. The method of claim 25, wherein the optical fiber and the outer conductor are coaxial in configuration.

28. The method of claim 25, wherein the optical fiber is parallel to the outer conductor.

29. The method of claim 25, wherein the outer conductor comprises copper.

30. The method of claim 25, wherein the outer conductor comprises stainless steel.

31. The method of claim 25, wherein the outer conductor comprises:
a twisted pair of solid conductor.

32. The method of claim 25, wherein the outer conductor comprises:
a twisted pair of flexible conductor.

33. The method of claim 25, wherein the outer conductor comprises a mesh configuration.

34. The method of claim 25 wherein the second node comprises a wireless access point and wherein a wireless device communicates with the wireless access point by use of a wireless signal.

35. The method of claim 25, further comprising:
an outer protection disposed on the outer conductor.

36. The method of claim 25, wherein the hybrid cable comprises:
a second optical fiber and a second outer conductor.

37. An apparatus for supplying power over an optical link, the apparatus comprising:
means for transmitting an optical signal along an optical fiber, and for transmitting a power signal along an outer conductor, wherein a non-conductive material is between the optical fiber and the outer conductor;
a first fiber optic link;
a first node;
a first connector coupled by the first fiber optic link to the first node;
a first conductor;
a power source, wherein the first connector is further coupled by the first conductor to the power source;
a second fiber optic link;
a second node;
a second connector coupled by the second fiber optic link to the second node; and
a second conductor, wherein the second connector is coupled by the second conductor to the second node.

38. The apparatus of claim 37 wherein the second node comprises a wireless access point and wherein a wireless device communicates with the wireless access point by use of a wireless signal.

* * * * *